(12) United States Patent
Marash

(10) Patent No.: US 6,198,693 B1
(45) Date of Patent: Mar. 6, 2001

(54) SYSTEM AND METHOD FOR FINDING THE DIRECTION OF A WAVE SOURCE USING AN ARRAY OF SENSORS

(75) Inventor: Joseph Marash, Haifa (IL)

(73) Assignee: Andrea Electronics Corporation, Melville, NY (US)

( * ) Notice: Subject to any disclaimer, the term of this patent is extended or adjusted under 35 U.S.C. 154(b) by 0 days.

(21) Appl. No.: 09/059,503

(22) Filed: Apr. 13, 1998

(51) Int. Cl.$^7$ ........................................... G01S 3/80
(52) U.S. Cl. ..................... 367/125; 367/118; 367/122; 342/417
(58) Field of Search ..................... 367/118, 119, 367/122, 123, 125; 342/147, 157, 417; 381/71.12; 348/171, 172

(56) References Cited

U.S. PATENT DOCUMENTS

| | | | |
|---|---|---|---|
| 3,778,831 | * 12/1973 | Marchand | 343/106 D |
| 4,862,180 | * 8/1989 | Martin | 342/417 |
| 5,099,248 | * 3/1992 | Brommer | 342/430 |
| 5,512,909 | * 4/1996 | Kronhamm | 342/147 |
| 5,914,912 | * 6/1999 | Yang | 367/119 |

FOREIGN PATENT DOCUMENTS 56-76066 * 6/1981 (JP).

* cited by examiner

*Primary Examiner*—Nelson Moskowitz
(74) *Attorney, Agent, or Firm*—Frommer Lawrence & Haug LLP; Thomas J. Kowalski; Bruno Polito

(57) ABSTRACT

A system and method for finding the direction of a wave source using an array of sensors. The system includes a sensor array for measuring waves from the wave source, an approximate-direction finder for finding the approximate direction of the wave source in terms of a sensor pair from the sensors, a precise-direction finder for finding the precise direction of the wave source based on the approximate direction found, and a measurement qualification unit for evaluating the validity of the precise direction under a measurement criterion and discarding the measurements if the criterion is not met.

49 Claims, 11 Drawing Sheets

SYSTEM AND METHOD FOR FINDING THE DIRECTION OF A WAVE SOURCE USING AN ARRAY OF SENSORS

1. FIELD OF THE INVENTION

The present invention relates generally to signal processing, and more specifically to a system and method using signal processing for finding the direction of a particular wave source using an array of sensors.

2. BACKGROUND OF THE INVENTION

A system for finding or tracking the direction of a particular wave source has many applications. One example is a directional microphone system, where a microphone is to be pointed to the direction of a particular sound source. Another is a video conferencing system, where a camera needs to be moved to the direction of the participating speaker.

One well-known technique of wave-source direction finding is beamforming. Beamforming, itself well-known in the art, uses an array of sensors located at different points in space. Connected to the array of sensors is a spatial filter that combines the signals received from the sensors in a particular way so as to either enhance or suppress signals coming from certain directions relative to signals from other directions.

Where the sensors are microphones, unless two microphones are located at equidistant from a sound source (i.e., arranged so that the line connecting the two microphones is perpendicular to the direction of the sound source), sound originating from the sound source arrives at any two microphones at different times, thereby producing a phase difference in the received signals.

If the received signals are appropriately delayed and combined by changing the spatial filter coefficients, the behavior of the microphone array can be adjusted such that it exhibits maximum receiving sensitivity toward a particular direction. In other words, the direction of maximum receiving sensitivity (so called "looking direction" of the microphone array) can be steered without physically changing the direction of the microphone array. It is then possible to determine the direction of a particular sound source by logically (computationally) steering the looking direction of the microphone array over all directional angles and looking for the angle that produces the maximum signal strength.

However, the use of beamforming for sound-source direction finding has several drawbacks. First, a typical beamforming profile of receiving sensitivity over the angles of looking direction is so flat that it is, as a practical matter, difficult to find the peak point of maximum signal strength unless an inconvenience of a large microphone array is used. For example, the 3-dB attenuation points (reference points for signal discrimination) of a typical 15-cm microphone array may be separated by as much as 100 degrees. At small angles such as 5 degrees, the corresponding attenuation is insignificant. As a result, even a slight numerical error or noise may perturb the result, giving an erroneous direction.

Second, beamforming involves scanning the space for the direction producing the maximum received signal strength. Finding the source direction in terms of a horizonal direction (azimuth) and a vertical direction (elevation) involves searching two-dimensional space, which is computationally expensive.

Third, in order to determine the source direction with a high spatial accuracy, it is necessary to perform the beamforming calculation at a very high resolution (for example, every 1 degree). This requires delaying and summing the received signals at a very small delay step, which, in turn, requires that the signal be sampled at a very high sampling rate, imposing a severe computational burden.

Another method of finding the direction of a sound source is to measure time delays between a pair of sensors. For example, Hong Wang & Peter Chu, Voice Source Localization for Automatic Camera Pointing System in Videoconferencing, Proc. IEEE International Conference on Acoustics, Speech, and Signal Processing, April 1997, pp. 187–90, disclose an array of microphones mounted on a vertical plane, three of them arranged in a horizonal line, and the fourth located above the center one of the three. The horizontal direction of a sound source (azimuth) is calculated by measuring the time delays of incoming signals between the two remote microphones in the horizontal line. The vertical direction (elevation) is calculated by measuring the time delays of incoming signals between the center microphone in the horizontal line and the upper microphone.

The Wang & Chu system has several drawbacks. First, since all the microphones are on the same vertical plane, they produce the same delay whether sound is coming from the front or from the back. Since the system cannot distinguish between a front and a back, ambiguities are inevitable.

Second, the performance of the system is not symmetric with respect to looking sideways and looking forward. The capability of such a system to resolve and estimate the direction of a source depends on the change of time delay in response to an incremental change in the angular direction. The time delay between two incoming signals at two adjacent microphones is:

$$\text{time delay} = \sin(\phi) * \text{aperture} / \text{sound-velocity},$$

where $\phi$ is the angle of arrival of the sound waves, measured with respect to the normal of the microphone array, and the aperture is the spacing between two nearest microphones. Note that the change in time delay is obtained as the derivative of $\sin(\phi)$, which is a function of $\cos(\phi)$. For the same incremental angular change, the resulting time delay when the looking direction is sideways (when $\phi$ approaches 90 degrees) is smaller than when the looking direction is forward (when $\phi$ approaches 0 degree). As a result, the performance of the system looking sideways is poorer than that looking forward.

Third, the Wang & Chu system does not provide any indication of how reliable the measurements used for the direction determination were. The time delay measurement between a pair of microphones may not be reliable if it was measured in the presence of noise or based on non-relevant signals. The quality of measurement would be poor if the measurement were made in a noisy environment. Also, even if the measurement were of high quality, it may not be relevant to the direction determination. For example, if the time delay measurement were a measurement of reflected sound from a wall or furniture, or sound from a repeater source such as a loud speaker connected to an audio/video conferencing system, the measurement may not even be relevant to the direction determination. The Wang & Chu system does not provide any mechanism for verifying the quality or relevancy of measurement.

Therefore, there exists a need for a system and method that can determine the direction of a wave source accurately and efficiently, and that can also indicate the quality and relevancy of the measurements on which the direction determination is based.

3. SUMMARY OF THE INVENTION

Accordingly, it is an object of the present invention to provide a direction finding system capable of processing signals from an array of sensors to determine the direction of a particular wave source.

Another object of the invention is to provide a system which can estimate the wave-source direction by taking into account the directions measured from individual microphone pairs and combining them to find the best-estimated source direction.

Still another object is to provide a system which can verify the quality of measurements used to calculate the source direction and can disqualify the source direction if it is not valid under a proper measurement criterion.

These and other objects are achieved in accordance with the present invention, which is an apparatus for using an array of sensors for finding the approximate direction of the wave source in terms of the positions of a selected subset of sensors, using the approximate direction so found, determining the precise direction of the wave source, evaluating the validity of the precise direction using a measurement criterion, and disqualifying the precise direction if the measurement criterion is not met so that the measurements can be repeated. One preferred embodiment of the present invention comprises an array of analog microphones for sensing sound from a sound source, an A-to-D converter for sampling the analog signals to produce corresponding digital signals, a bandpass filter for filtering the digital signals to band-limited signals in a frequency band of interest, an approximate-direction finder for finding the approximate direction of the sound source, a precise-direction finder for finding the precise direction of the sound source based on the approximate direction, and a measurement qualification unit for verifying the validity of the precise direction using a certain measurement criterion and for disqualifying the measurement if the measurement criterion is not satisfied.

The present invention has the advantage of being computationally efficient because it does not involve a two-dimensional search of space, as a beamformer would require. It also has the advantage of performing reliably in a noisy environment because it verifies the validity of the source direction under a variety of measurement criteria and repeats the measurements if necessary.

The present invention may be understood more fully by reference to the following figures, detailed description and illustrative examples intended to exemplify non-limiting embodiments of the invention.

4. DESCRIPTION OF THE FIGURES

5. DETAILED DESCRIPTION OF PREFERRED EMBODIMENT

Figure 1:
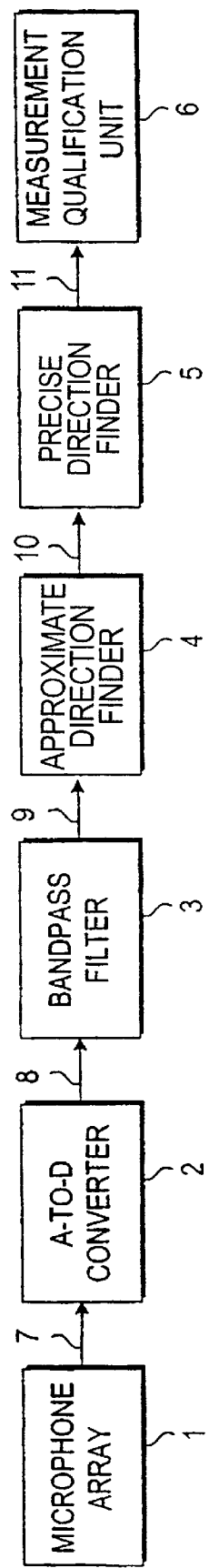
FIG. 1 is a functional diagram of the overall system including a microphone array, an A-to-D converter, a band-pass filter, an approximate-direction finder, a precise-direction finder, and a measurement qualification unit in accordance with the present invention.

FIG. 1 shows the functional blocks of a preferred embodiment in accordance with the present invention. The embodiment deals with finding the direction of a sound source, but the invention is not limited to such. It will be understood to those skilled in the art that the invention can be readily used for finding the direction of other wave sources such as an electromagnetic wave source.

The system includes an array of microphones 1 that sense or measure sound from a particular sound source and that produce analog signals 7 representing the measured sound. The analog signals 7 are then sampled and converted to corresponding digital signals 8 by an analog-to-digital (A-to-D) converter 2. The digital signals 8 are filtered by a band-pass filter 3 so that the filtered signals 9 contain only the frequencies in a specific bandwidth of interest for the purpose of determining the direction of the sound source. The filtered signals 9 are then fed into an approximate-direction finder 4 which calculates an approximate direction 10 in terms of a microphone pair selected among the microphones. The precise-direction finder 5 estimates the precise-direction 11 of the sound source based on the approximate direction. The validity of the precise-direction 11 is checked by a measurement qualification unit 6, which invalidates the precise direction if it does not satisfy a set of measurement criteria. Each functional block is explained in more detail below.

5.1. Microphone Array

Figure 2:
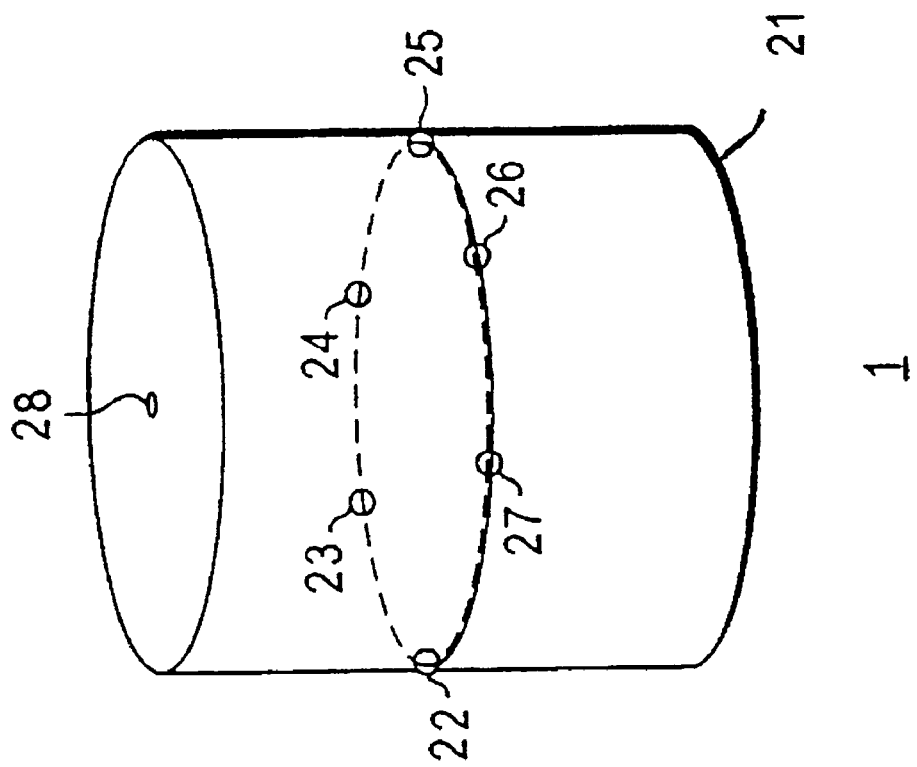
FIG. 2 is a perspective view showing the arrangement of a particular embodiment of the microphone array of FIG. 1.

FIG. 2 shows an example of the array of microphones 1 that may used in accordance with the present invention. The microphones sense or measure the incident sound waves from a sound source and generate electronic signals (analog signals) representing the sound. The microphones may be omni, cardioid, or dipole microphones, or any combinations of such microphones.

The example shows a cylindrical structure 21 with six microphones 22–27 mounted around its periphery, and an upper, center microphone 28 mounted at the center of the upper surface of the structure. The upper, center microphone is optional, but its presence improves the accuracy of the precise direction, especially the elevation angle. Although the example shows the subset of microphones in a circular arrangement of the microphone array, the microphone array may take on a variety of different geometries such as a linear array or a rectangular array.

5.2 A-to-D Converter

The analog signals representing the sound sensed or measured by the microphones are converted to digital signals by the A-to-D converter 2, which samples the analog signals at an appropriate sampling frequency. The converter may employ a well-known technique of sigma-delta sampling, which consists of oversampling and built-in low-pass filtering followed by decimation to avoid aliasing, a phenomenon due to inadequate sampling.

When an analog signal is sampled, the sampling process creates a mirror representation of the original frequencies of the analog signal around the frequencies that are multiples of the sampling frequency. "Aliasing" refers to the situation where the analog signal contains information at frequencies above one half of the sampling frequency so that the reflected frequencies cross over the original frequencies, thereby distorting the original signal. In order to avoid aliasing, an analog signal should be sampled at a rate at least twice its maximum frequency component, known as the Nyquist frequency.

In practice, a sampling frequency far greater than the Nyquist frequency is used to avoid aliasing problems with system noise and less-than-ideal filter responses. This oversampling is followed by low-pass filtering to cut off the frequency components above the maximum frequency component of the original analog signal. Once the digital signal is Nyquist limited, the rate must be reduced by decimation. If the oversampling frequency is n times the Nyquist frequency, the rate of the digital signal after oversampling needs to be reduced by decimation, which takes one sample for every n samples input.

An alternative approach to avoid aliasing is to limit the bandwidth of signals using an analog filter that halves the sampling frequency before the sampling process. This approach, however, would require an analog filter with a very sharp frequency cut-off characteristic.

5.3 Bandpass Filter

The purpose of the bandpass filter 3 is to filter the signals sensed or measured by the microphones so that the filtered signals contain those frequencies optimal for detecting or determining the direction of the signals. Signals of too low a frequency do not produce enough phase difference at the microphones to accurately detect the direction. Signals of too high a frequency have less signal energy and are thus more subject to noise. By suppressing signals of the extreme high and low frequencies, the bandpass filter 3 passes those signals of a specific bandwidth that can be further processed to detect or determine the direction of the sound source. The specific values of the bandwidth depends on the type of target wave source. If the source is a human speaker, the bandwidth may be between 300 Hz and 1500 Hz where typical speech signals have most of their energy concentrated. The bandwidth may also be changed by a calibration process, a trial-and-error process. Instead of using a fixed bandwidth during the operation, initially a certain bandwidth is tried. If too many measurement errors result, the bandwidth is adjusted to decrease the measurement errors so as to arrive at the optimal bandwidth.

5.4 Direction Estimation

For efficiency of computation, the system first finds the approximate direction of the sound source, without the burden of heavy computation, and subsequently calculates the precise direction by using more computation power. The approximate direction is also used to determine the subset of microphones that are relevant to subsequent refinement of the approximate direction. In some configurations, some of the microphones may not have a line of sight to the source, and thus may create phase errors if they participate in further refinement of the approximate direction. Therefore, a subset of microphones are selected that would be relevant to further refinement of the source direction.

5.4.1 Approximate-Direction Finding

Figure 3:
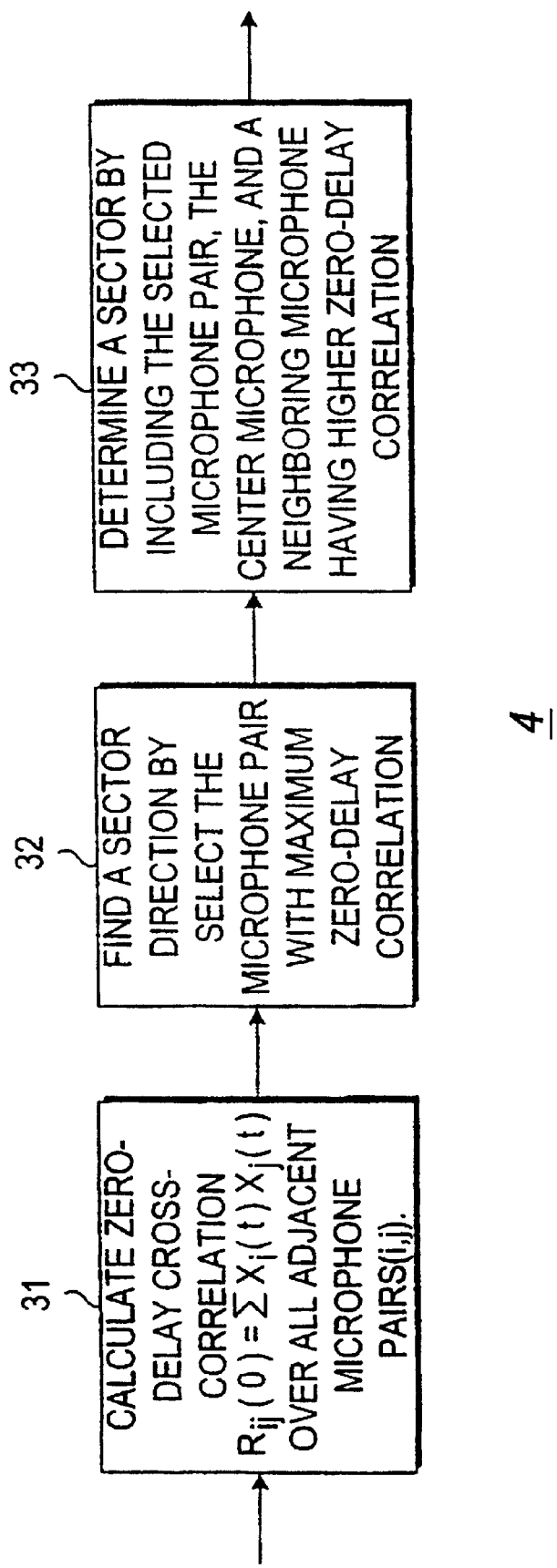
FIG. 3 is a functional diagram of an embodiment of the approximate-direction finder of FIG. 1.
Figure 4:
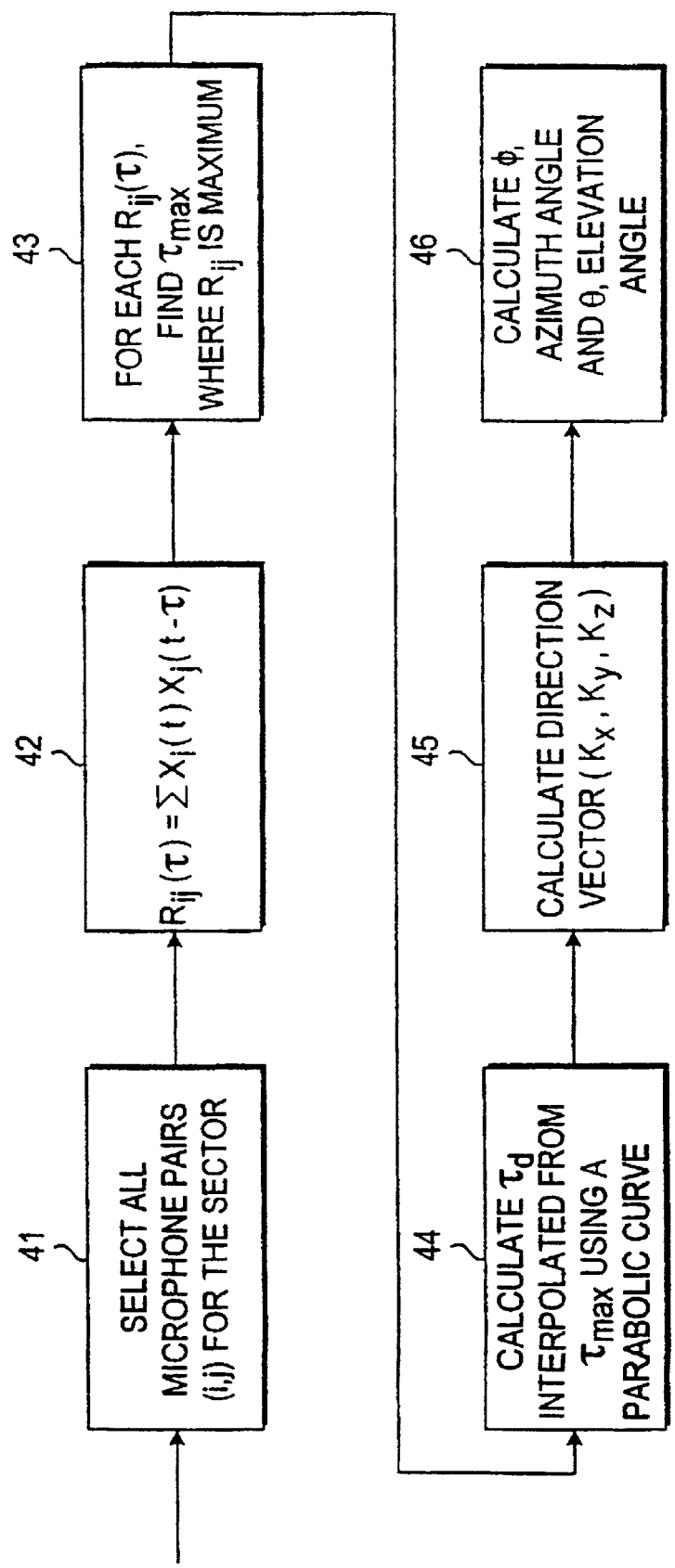
FIG. 4 is a functional diagram of an embodiment of the precise-direction finder of FIG. 1.

FIG. 3 shows the approximate-direction finder 4 in detail. It is based on the idea of specifying the approximate direction of the sound source in terms of a direction perpendicular to a pair of microphones. Let peripheral microphone pairs be the microphones located adjacent to each other around the periphery of the structure holding the microphones, except that a microphone located at the center of the structure, if any, are excluded. For each peripheral microphone pair, "pair direction" is defined as the direction in the horizontal plane, pointing from the center of the pair outward from the structure, perpendicular to the line connecting the peripheral microphone pair.

"Sector direction" is then defined as the pair direction closest to the source direction, selected among possible pair directions. If there are n pairs of peripheral microphones, there would be n candidates for the sector direction.

The sector direction corresponding to the sound source is determined using a zero-delay cross-correlation. For each peripheral microphone pair, a correlation calculator 31 calculates a zero-delay cross-correlation of two signals received from the microphone pair, $X_i(t)$ and $X_j(t)$. It is known to those skilled in the art that such a zero-delay cross-correlation function, $R_{ij}(0)$, over a time period T can be defined by the following formula:

$$R_{ij}(0) = \sum_{t=0}^{T} X_i(t)X_j(t)$$

It is noted that a correlation calculator is well-known to those skilled in the art and may be available as an integrated circuit. Otherwise, it is well-known that such a correlation calculator can be built using discrete electronic components such as multipliers, adders, and shift registers.

Among the peripheral microphone pairs, block 32 finds the sector direction by selecting the microphone pair that produces the maximum correlation. Since the signals having the same or similar phase are correlated with each other, the result is to find the pair with the same phase (equi-phase) or having the least phase difference. Since the plane of equi-phase is perpendicular to the propagation direction of the sound wave, the pair direction of the maximum correlation pair is, then, the sector direction, i.e., the pair direction closest to the source direction.

Once the sector direction is found, block 33 identifies the microphones that participate in further refinement of the approximate direction. "Sector" is defined as the subset of the microphones in the microphone array, which participate in calculating the precise direction of the sound source. For example, where some of the microphones in the array are blocked by a mechanical structure, the signals received by those microphones are not likely to be from direct-travelling waves, and thus such microphones should be excluded from the sector.

In one preferred embodiment, the sector includes the maximum-correlation peripheral microphone pair, another peripheral microphone adjacent to the pair, and a center microphone, if any. Of two peripheral microphones adjacent to the maximum-correlation peripheral microphone pair, the one with a higher zero-delay cross-correlation is selected. The inclusion of the center microphone is optional, but the inclusion helps to improve the accuracy of the source direction, because otherwise three adjacent microphones would be arranged almost in a straight line. There may be other ways of selecting the microphones to be included in the sector, and the information about such selection schemes may be stored in computer memory for an easy retrieval during the operation of the system.

5.4.2 Precise-Direction Finding

The precise-direction finder 5 calculates the precise direction of the sound source using a full cross-correlation. Block 41 first identifies all possible combinations of microphone pairs within the sector. For each microphone pair identified, block 42 calculates a full cross-correlation, $R_{ij}(\tau)$, over a time period T using the follow formula, a well-known formula to those skilled in the art:

$$R_{ij}(\tau) = \sum_{t=0}^{T} X_i(t) X_j(t-\tau)$$

As mentioned before, a correlation calculator is well-known to those skilled in the art and may be available as an integrated circuit. Otherwise, it is well-known that such a correlation calculator can be built using discrete electronic components such as multipliers, adders, and shift registers.

$R_{ij}(\tau)$ can be plotted as a cross-correlation curve. For each $R_{ij}(\tau)$, block 43 finds the delay, $\tau_s$, corresponding to the peak point of the cross-correlation curve. Note that this peak-correlation delay $\tau_s$ lies at a sampling point. In reality, however, the maximum-correlation point may be located between sampling points. Therefore, block 44 calculates such maximum-correlation delay (which may be between sampling points), $\tau_d$, by interpolating the cross-correlation function using a parabolic curve ($y=px^2+qx+r$) as follow:

$$C(k-1) = Pk^2 + q(k-1) + r$$

$$C(k) = Pk^2 + qk + r$$

$$C(k+1) = Pk^2 + q(k+1) + r$$

By solving the above equation for p, q, and r, the maximum point is obtained by obtaining the derivative of the parabolic curve and setting the derivative of the equation to zero. The maximum point $\tau_d$ is $-(\frac{1}{2}p)$, and is further expressed as follow:

$$\tau_d = \frac{1}{f_s}\left(k + \left(\frac{C(k-1) - C(k+1)}{2(C(k-1) - 2C(k) + C(k+1))}\right)\right)$$

where $f_s$ denotes the sampling frequency; k denotes the sampling point corresponding to $\tau_s$; and C(k) is the delay corresponding to sampling point k. The use of the interpolation technique improves the accuracy of the maximum-correlation delay, while eliminating the need for using a very high sampling rate.

Since each maximum-correlation delay calculated for each microphone pair indicates the direction of the sound source measured by individual microphone pairs, the individual maximum-correlation delays are combined to estimate an average direction of the sound source. The estimation process provides a better indication of the source direction than each individual measured directions because it eliminates ambiguity problems inherent to each individual pair and provides a mechanism to verify the relevancy of the individual measurements by possibly eliminating those individual measurements that are far off from the source direction.

Block 45 calculates the precise direction of the sound source in terms of a vector in the Cartesian coordinates, $K=(K_x, K_y, K_z)$, from the vector of individual measured delays, $T_d$, by solving the linear equation between K and $T_d$. The time delay between any two sensors is equal to the projection of the distance vector between them along the K vector divided by the sound velocity. Thus, the $T_d$ vector can be expressed as follows:

$$T_d = -(RK)/c$$

where c is the speed of sound; R denotes the matrix representing the geometry of the microphone array in terms of position differences among the microphones as follows:

$$R = \begin{bmatrix} [X_2 - X_1, & Y_2 - Y_1, & Z_2 - Z_1] \\ \vdots & & \\ [X_M - X_1, & Y_M - Y_1, & Z_M - Z_1] \end{bmatrix}$$

Since the above equation is over-determined in that there are more constraints than the number of variables, the least-square (LS) method is used to obtain the optimal solution. Defining the error as the difference between the measured time delay vector and the evaluated time delay calculated, the error vector $\epsilon$ is given by:

$$\epsilon = (RK/c) + T_d$$

The solution depends on the covariance matrix $\Lambda$ of the delay measurements which is defined by $$\Lambda = E\{T_d T_d^T\} - E\{T_d\} E\{T_d\}^T = COV\{T_d\}$$

where $E\{\ \}$ denotes the expected value operator, and $\{*\}^T$ denotes the transpose of a matrix. The LS estimated solution, K, is then expressed in the following formula:

$$K = -c(R^T \Lambda^{-1} R)^{-1} R^T \Lambda^{-1} T_d = -cBT_d$$

where $\{*\}^{-1}$ denotes the inverse of a matrix. For derivation of the equation, see A. Gelb, Applied Optimal Estimation, the MIT Press, p. 103.

Note that the B matrix depends only on the geometry of the microphone array, and thus can be computed off-line, without burdening the computation requirement during the direction determination.

Figure 5:
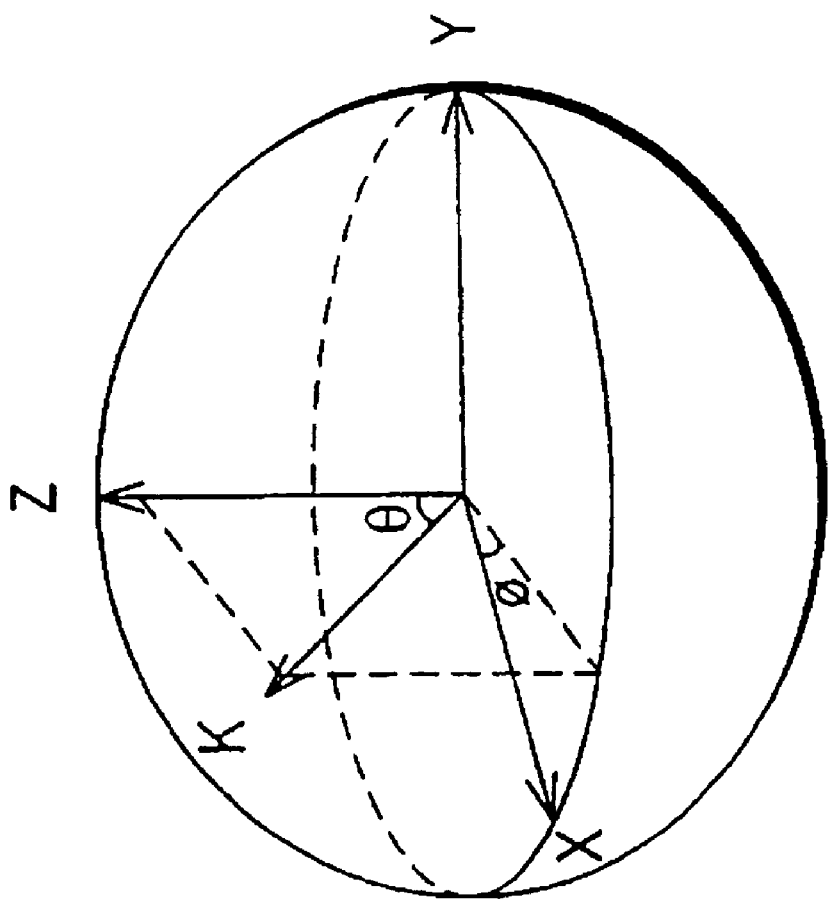
FIG. 5 is the 3-D coordinate system used to describe the present invention.

Block 46 converts K into polar coordinates. FIG. 5 shows the 3-dimensional coordinate system used in the present invention. An azimuth angle, $\phi$, is defined as the angle of the source direction in the horizontal plane, measured clockwise from a reference horizonal direction (e.g. x-axis). An elevation angle, $\theta$, is defined as the vertical angle of the source direction measured from the vertical axis (z-axis).

Block 46 calculates $\phi$ and $\theta$ from $K_x$, $K_y$, and $K_z$ by converting the Cartesian coordinates to the polar coordinates by solving the nonlinear equation between ($K_x$, $K_y$, $K_z$) and ($\phi$, $\theta$):

$$\begin{bmatrix} [K_x] \\ [K_y] \\ [K_z] \end{bmatrix} = \begin{bmatrix} [\sin(\Theta)\cos(\phi)] \\ [\sin(\Theta)\sin(\phi)] \\ [\cos(\Theta)] \end{bmatrix}$$

In the case of a 3-dimensional microphone array (with the upper microphone), the above equation yields three non-linear equations with two unknowns ($\phi$, $\theta$). The problem is over-determined that there are more equations than the number of variables. The LS solution for ($\phi$, $\theta$) has no close-form solution, but a suboptimal, closed-form, estimation can be found as:

$$\phi = \tan^{-1}(K_y/K_x)$$

$$\theta = \tan^{-1}(\sqrt{(K_x^2 + K_y^2)}/K_z)$$

If a 2-dimensional microphone array were used (without the upper microphone), block 46 calculates $\phi$ and $\theta$ from $K_x$ and $K_y$ using the following formula:

$$\phi = \tan^{-1}(K_y/K_x)$$

$$\theta = \cos^{-1}(\sqrt{1 - (K_x^2 + K_y^2)})$$

Note that the algorithm can function even when the microphones are arranged in a 2-dimensional arrangement and still capable of resolving the azimuth and elevation.

5.5 Measurement Qualification Unit

When the precise-direction finder 5 calculates the precise-direction of the sound source, the result may not reflect the true direction of the sound source due to various noise and measurement errors. The purpose of the measurement qualification unit 6 is to evaluate the soundness or validity of the precise direction using a variety of measurement criteria and invalidate the measurements if the criteria are not satisfied.

FIGS. 6a, 6b, 6c, and 6d show different embodiments of the measurement qualification unit using a different measurement criterion. These embodiments may be used individually or in any combination.

Figure 6A:
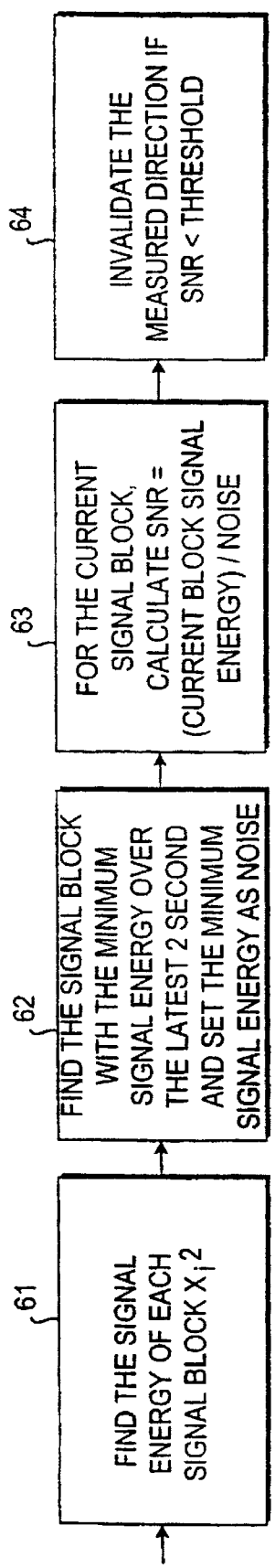
FIG. 6A is a functional diagram of a first embodiment of the measurement qualification unit of FIG. 1.

FIG. 6a shows a first embodiment of the qualification unit that uses a signal-to-noise ratio (SNR) as a measurement criterion. The SNR is defined as a ratio of a signal power to a noise power. To calculate the SNR, the measured signals are divided into blocks of signals having a predetermined period such as 40 milliseconds. Block 61 calculates the signal power for each signal block by calculating the square-sum of the sampled signals within the block. The noise power can be measured in many ways, but one convenient way of measuring the noise power may be to pick the signal power of the signal block having the minimum signal power and to use it as the noise power. Block 62 selects the signal block having the minimum power over a predetermined interval such as 2 second. Block 63 calculates the SNR as the ratio of the signal power of the current block to that of the noise power. Block 64 invalidates the precise direction if the SNR is below a certain threshold.

Figure 6B:
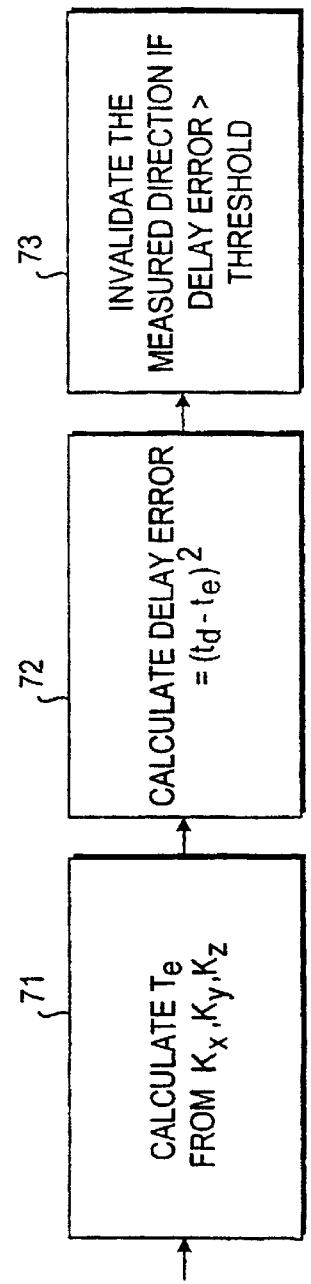
FIG. 6B is a functional diagram of a second embodiment of the measurement qualification unit of FIG. 1.

FIG. 6b shows a second embodiment of the measurement qualification unit that uses a spread (range of distribution) of individual measured delays as a measurement criterion. The precise source direction calculated by the precise-direction finder represents an average direction among the individual measured directions measured by microphone pairs in the sector. Since delays are directly related to direction angles, the spread of the individual measured delays with respect to the individual estimated delay indicates how widely the individual directions vary with respect to the precise direction. Thus, the spread gives a good indication as to the validity of the measurements. For example, if the individual measured delays are too widely spread, it is likely to indicate some kind of measurement error.

$T_e$ is defined as a vector representing the set of individual estimated delays $\tau_e$ corresponding to the precise direction, K. Block 71 calculates $T_e$ from K based on the linear relation between K and $T_e$.

$$T_e = (-RK)/c$$

where R denotes the position difference matrix representing the geometry of the microphone array as follows $$R = \begin{bmatrix} [X_2 - X_1, & Y_2 - Y_1, & Z_2 - Z_1] \\ & \vdots & \\ [X_M - X_1, & Y_M - Y_1, & Z_M - Z_1] \end{bmatrix}$$

and c is the propagation velocity of sound waves.

Block 72 compares the individual measured delays $\tau_d$ with the individual estimated delays $\tau_e$ and calculates the spread of individual measured delays using the following measure:

$$\Sigma e^2 = \Sigma (\tau_d - \tau_e)^2$$

If this spread exceeds a certain threshold, block 73 invalidates the precise source direction.

Alternatively, the spread can be calculated directly from the individual measured delays using the following:

$$\Sigma e^2 = E^* T_d$$

where $E = R(R^T R)^{-1} R^T - I$; and I is the identity matrix.

Figure 6C:
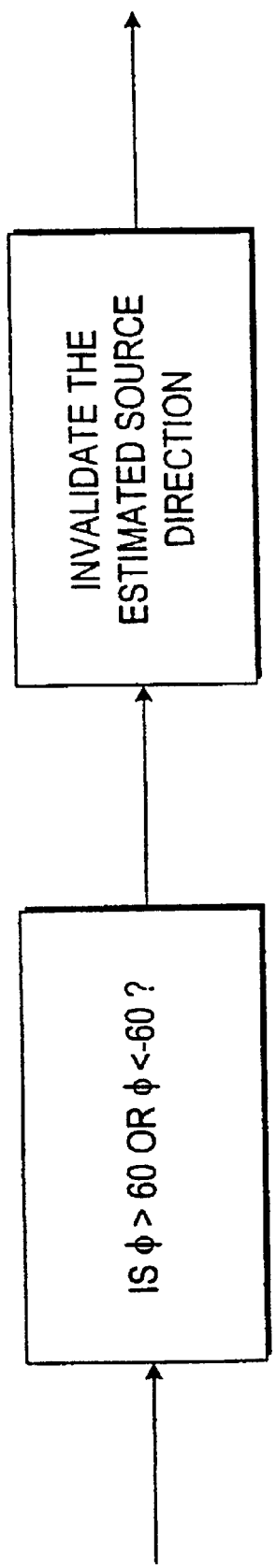
FIG. 6C is a functional diagram of a third embodiment of the measurement qualification unit of FIG. 1.

FIG. 6c shows a third embodiment of the measurement qualification unit that uses the azimuth angle, $\phi$, as a measurement criterion. If $\phi$ deviates significantly from the sector direction (the approximate source direction), it is likely to indicate that the precise direction is false. Therefore, if $\phi$ is not within a permissible range of angles (e.g. within +/−60 degrees) of the sector direction, the precise direction is invalidated.

Figure 6D:
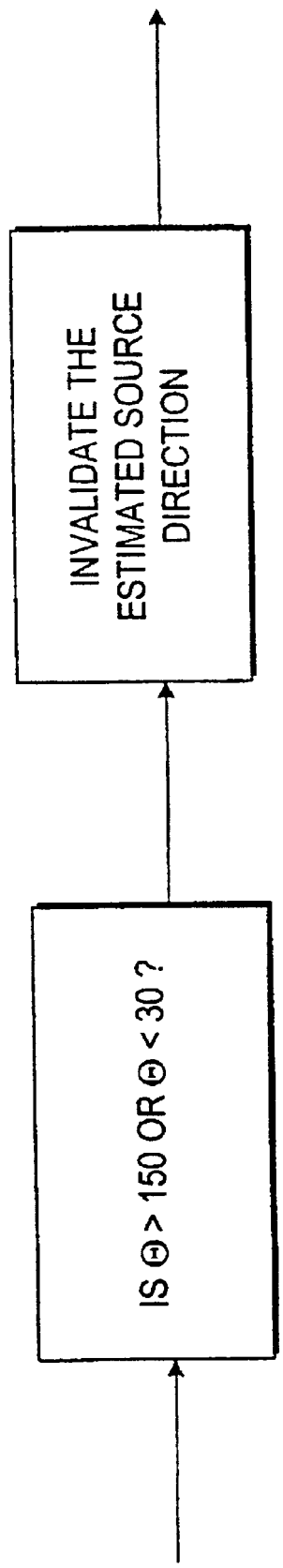
FIG. 6D is a functional diagram of a fourth embodiment of the measurement qualification unit of FIG. 1.
Figure 7A:
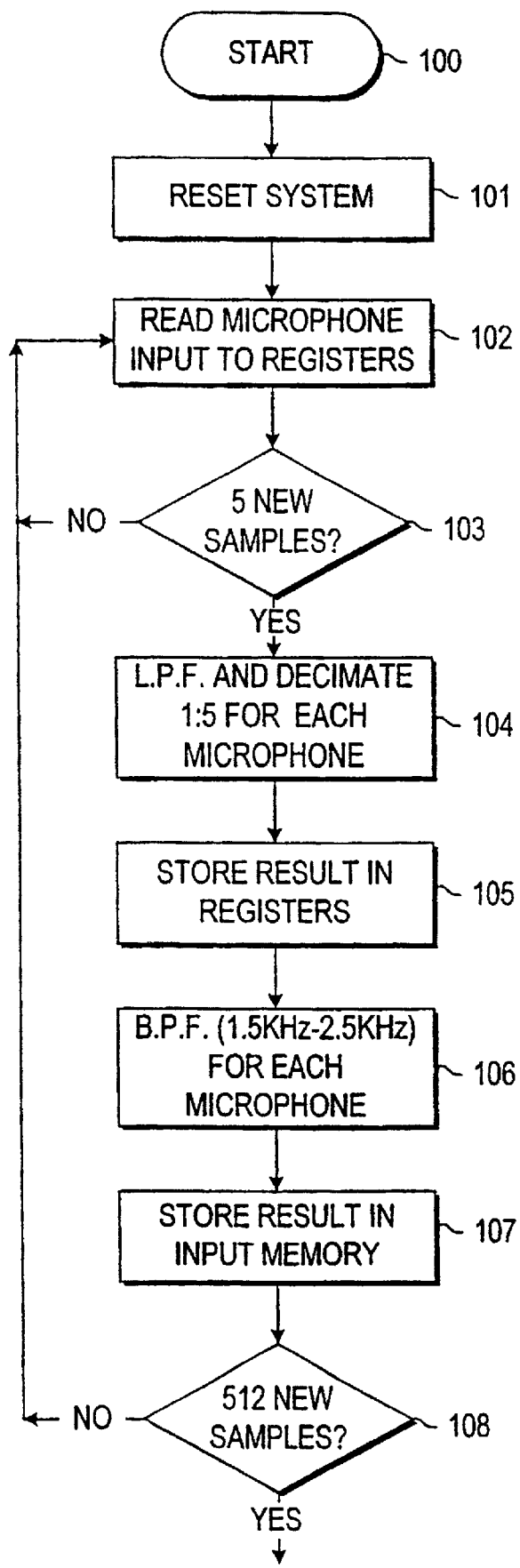
FIGS. 7A–7D are a flow chart depicting the operation of a program that can be used to implement the method in accordance with the present invention.
Figure 7B:
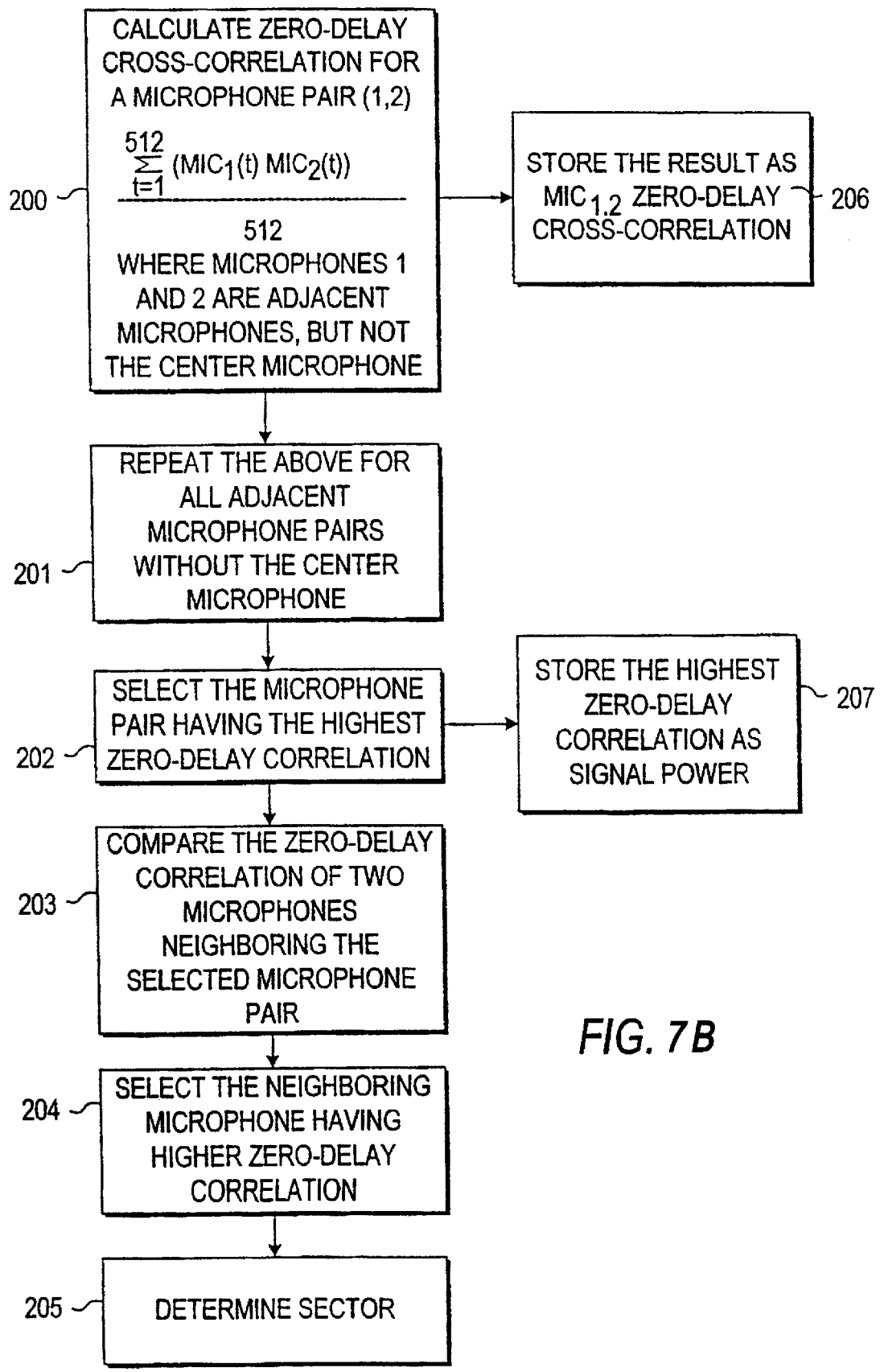
Figure 7C:
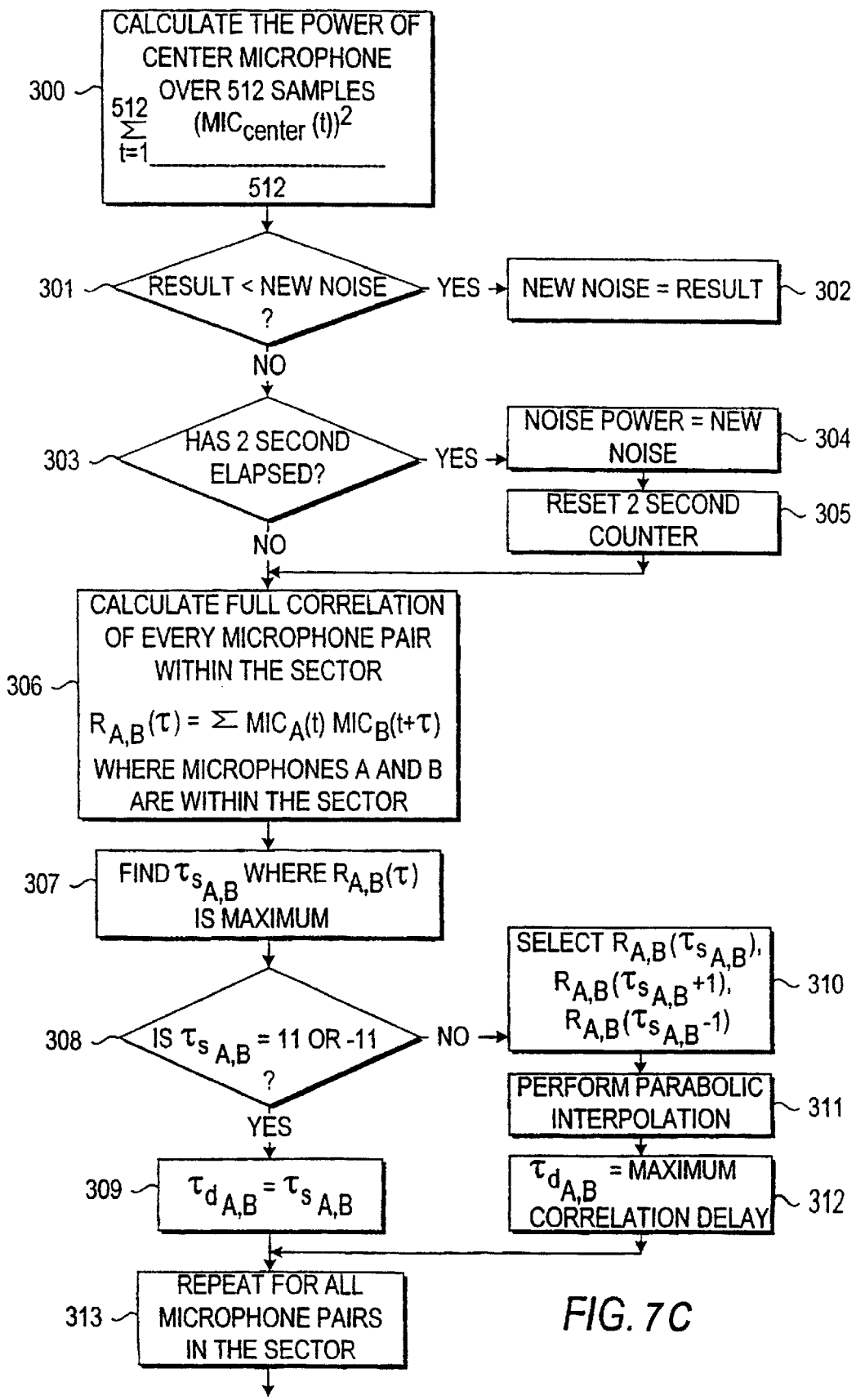
Figure 7D:
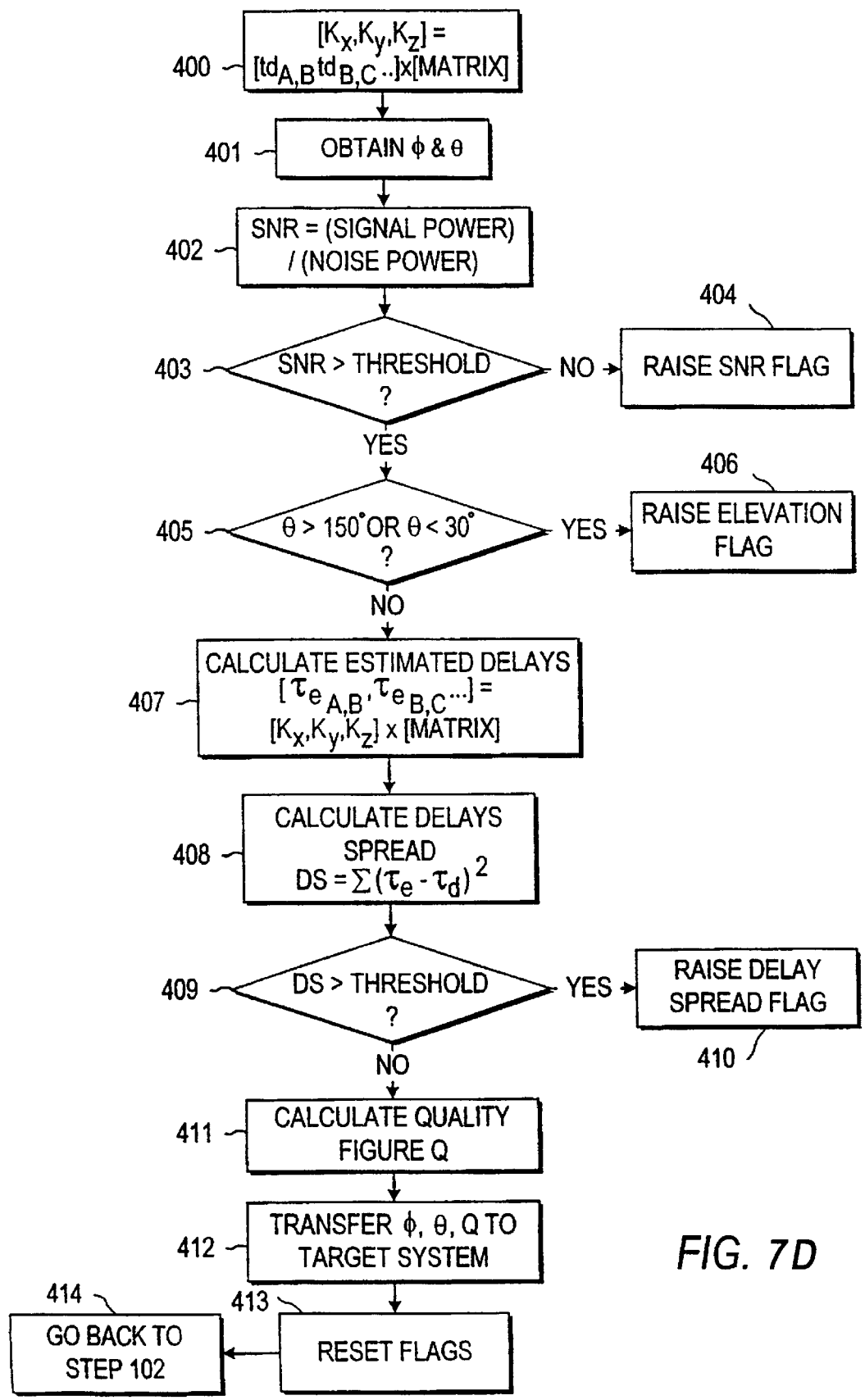

FIG. 6d shows a fourth embodiment of the measurement qualification unit that uses the elevation angle, $\theta$, as a measurement criterion. If $\theta$ deviates significantly from the horizontal direction (where $\theta=90°$), it is likely to indicate the direction of reflected sound waves through the ceiling or the floor rather than that of direct sound waves. Therefore, if $\theta$ is not within a range of allowable angles (e.g. from 30° to 150°), the precise direction is invalidated.

As mentioned before, the above embodiments can be used selectively or combined to produce a single quality figure of measurement, Q, which may be sent to a target system such as a controller for a videoconferencing system. For example, Q may be set to 0 if any of the error conditions above occurs and set to the SNR otherwise.

The direction finding system of the present invention can be used in combination with a directional microphone system, which may include an adaptive filter. Such adaptive filter is not limited to a particular kind of adaptive filter. For example, one can practice the present invention in combination with the invention disclosed in applicant's commonly assigned and co-pending U.S. patent application Ser. No. 08/672,899, filed Jun. 27, 1996, entitled 'System and Method for Adaptive Interference Cancelling,' by inventor Joseph Marash and its corresponding PCT application WO 97/50186, published Dec. 31, 1997. Both applications are incorporated by reference herein in their entirety.

Specifically, the adaptive filter may include weight constraining means for truncating updated filter weight values to predetermined threshold values when each of the updated filter weight value exceeds the corresponding threshold value. The adaptive filter may further include inhibiting means for estimating the power of the main channel and the power of the reference channels and for generating an inhibit signal to the weight updating means based on normalized power difference between the main channel and the reference channels.

The weight constraining means may include a frequency-selective weight-control unit, which includes a Fast Fourier Transform (FFT) unit for receiving adaptive filter weights and performing the FFT of the filer weights to obtain frequency representation values, a set of frequency bins for storing the frequency representation values divided into a set of frequency bands, a set of truncating units for comparing the frequency representation values with a threshold assigned to each bin and for truncating the values if they exceed the threshold, a set of storage cells for temporarily storing the truncated values, and an Inverse Fast Fourier Transform (IFFT) unit for converting them back to the adaptive filter weights.

The adaptive filter in the directional microphone that may be used in combination with the present invention may also employ dual-processing interference cancelling system where adaptive filter processing is used for a subset of a frequency range and fixed filter processing is used for another subset of the frequency range. For example, one can practice the present invention in combination with the invention disclosed in applicant's commonly assigned and co-pending U.S. patent application Ser. No. 08/840,159, filed Apr. 14, 1997, entitled 'Dual-Processing Interference Cancelling System,' by inventor Joseph Marash and corresponding continuation-in-part application, filed Apr. 8, 1997. Both applications are incorporated by reference herein in their entirety.

It is noted that the adaptive filter processing portion of the dual processing may also employ the adaptive filter processing disclosed in applicant's commonly assigned and co-pending U.S. patent application Ser. No. 08/672,899, filed Jun. 27, 1996, entitled 'System and Method for Adaptive Interference Cancelling,' by inventor Joseph Marash and its corresponding PCT application WO 97/50186, published Dec. 31, 1997.

5.6 Software Implementation

The present invention described herein may be implemented using a commercially available digital signal processor (DSP) such as Analog Device's 2100 Series or any other general purpose microprocessors. For more information on Analog Device 2100 Series, see Analog Device, ADSP-2100 Family User's Manual, 3rd Ed., 1995.

FIGS. 8A–8D show a flow chart depicting the operation of a program in accordance with a preferred embodiment of the present invention. The program uses measurement flags to indicate various error conditions.

When the program starts (step 100), it resets the system (step 101) by resetting system variables including various measurement flags used for indicating error conditions. The program then reads into registers microphone inputs sampled at the sampling frequency of 64 KHz (step 102), which is oversampling over the Nyquist frequency. As mentioned in Section 5.2, oversampling allows anti-aliasing filters to be realized with a much more gentle cut-off characteristic of a filter. Upon reading every 5 samples (step 103), the program performs a low-pass filter operation and a decimation by taking one sample out of every 5 samples for each microphone (step 104). The decimated samples are stored in the registers (step 105).

The program performs a bandpass filter operation on the decimated samples so that the output contains frequencies ranging from 1.5 to 2.5 KHz (step 106). The output is stored in input memory (step 107). The program repeats the above procedure until 512 new samples are obtained (step 108).

If the 512 news samples are reached, the program takes each pair of adjacent microphone pairs and multiples the received signals and add them to obtain zero-delay cross-correlation (step 200), and the results are stored (step 206). The calculation of zero-delay cross-correlation is repeated for all adjacent microphone pairs, not involving the center microphone (step 201).

The microphone pair having the highest zero-delay cross-correlation is selected (step 202) and the value is stored as the signal power (step 207), which will be used later. Of those two microphones adjacent to the selected pair, the program calculates the zero-correlation (step 203) and the microphone having the higher correlation is selected (step 204). The program determines the sector by including the selected microphone pair, the neighboring microphone selected, and the center microphone, if there is one.

The program calculates the average power of the 512 samples taken from the center microphone (step 300). The lowest average energy during the latest 2 seconds is set to be the noise power (steps 301–305).

The program calculates the full cross-correlation of signals received by each microphone pair in the sector (step 306). The program finds the peak cross-correlation delay, $\tau_s$, where the correlation is maximum (step 307).

$\tau_s$ lies on a sampling point, but the actual maximum-correlation delay, $\tau_d$, may occur between two sampling points. If $\tau_s$ is either the maximum or minimum possible delay (step 308), $\tau_d$ is set to $\tau_s$ (step 309). Otherwise, the program finds the actual maximum-correlation delays using the parabolic interpolation formula described in Section 5.4.1 (steps 310–312). The above steps are repeated for all the microphone pairs in the sector (step 313).

The program uses the B matrix mentioned in Section 5.4.2 to obtain the direction vector $K=[K_x, K_y, K_z]$ from the set of time delays (step 400).

The program then calculates the azimuth angle, $\phi$, and the elevation angle, $\theta$, corresponding to the direction vector obtained (step 401).

The program calculates the SNR as the ratio of the signal power and the noise power (step 402). If the SNR exceeds a threshold (step 403), the program raises the SNR Flag (step 404).

The program then evaluates the elevation angle, $\theta$. If $\theta$ is not within a permissible range of angles (e.g. from 30° to 150°) (step 405), the Elevation Flag is raised (step 406).

The program calculates corresponding delays from the precise direction (step 407). The program calculates a delay spread as the sum of squares of the difference between the individual measured delays and the individual estimated delays (step 408). If the delay spread exceeds a certain threshold (step 409), the Delay Spread Flag is raised (step 410).

The program calculates the quality figure of measurement, Q, as a combination of all or part of the measurement criteria above (step 411). For example, Q may be set to 0 if any of the measurement flags was raised and set to the SNR otherwise.

The program transfers $\phi$, $\theta$, and Q to a target system, such as an automatic camera tracking system used in a video conferencing application (step 412). The program resets the measurement flags (step 413) and goes back to the beginning of the program (step 414).

While the invention has been described with reference to several preferred embodiments, it is not intended to be limited to those embodiments. It will be appreciated by those of ordinary skill in the art that many modifications can be made to the structure and form of the described embodiments without departing from the spirit and scope of the invention, which is defined and limited only in the following claims. For example, the present invention can be used to locate a direction of a source transmitting electromagnetic waves.

What is claimed is:

1. A system for finding the direction of a wave source, comprising:

an array of sensors arranged in a predetermined geometry including sensors arranged in a circular arrangement, each sensor for sensing waves from the wave source and generating analog signals representing the waves;

an analog-to-digital converter, connected to the array of sensors, for converting the analog signals to digital signals;

a bandpass filter for filtering the digital signals to generate filtered signals containing frequencies of a specific bandwidth;

an approximate-direction finder, connected to receive the filtered signals, for processing the filtered signals to find the approximate direction of the wave source in terms of a sensor pair selected among the sensors;

a precise-direction finder, connected to receive information from the approximate-direction finder, for finding the precise direction of the wave source by further processing the signals representing the waves based on the approximate direction; and a measurement qualification unit, connected to the precise-direction finder, for evaluating validity of the precise direction using a measurement criterion and invalidating the precise direction if the measurement criterion is not met.

2. The system of claim 1, wherein the wave source is a sound source and the sensors are microphones.

3. The system of claim 1, wherein the measurement qualification unit comprises:

at least means for calculating a signal-to-noise ratio (SNR); and means for invalidating the precise direction if the SNR is below a threshold.

4. The system of claim 3, wherein the means for calculating a signal-to-noise ratio comprises:

means for calculating a signal power for a current signal block of the measured signals;

means for calculating a noise power by finding the minimum signal power over signal blocks within a predetermined time period; and means for calculating the signal-to-noise ratio by calculating the ratio of the signal power of a signal block to the noise power.

5. The system of claim 3, wherein the precise direction is calculated in terms of an azimuth angle and an elevation angle.

6. The system of claim 5, wherein the measurement qualification unit further comprises:

means for invalidating the precise direction of the wave source if the elevation angle is not within allowable values.

7. The system of claim 5, wherein the approximate-direction finder comprises:

means for calculating a zero-delay cross-correlation for pairs of sensors adjacent to each other; and means for identifying a sector direction by selecting the sensor pair having the highest zero-delay cross-correlation.

8. The system of claim 7, wherein the measurement qualification unit comprises:

means for comparing the estimated azimuth angle with the sector direction; and means for invalidating the precise direction of the wave source if the difference between the azimuth angle and the sector direction is not within allowable values.

9. The system of claim 3, wherein the precise-direction finder comprises:

means for identifying all sensor pairs within the sector;

means for calculating individual measured delays by calculating a full cross-correlation for every pair of sensors within the sector; and means for finding the precise direction by finding a least-square solution of the individual measured delays.

10. The system of claim 9, wherein the measurement qualification unit comprises:

means for generating individual estimated delays from the precise direction;

means for calculating a delay spread by calculating differences between the individual measured delays and the individual estimated delays; and means for invalidating the precise direction of the wave source if the delay spread exceeds a threshold.

11. A system for finding the direction of a sound source, comprising:

an array of microphones arranged in a predetermined geometry including microphones arranged in a circular arrangement, each microphone for sensing sound waves from the sound source and generating analog signals representing the sound waves;

an analog-to-digital converter, connected to the array of microphones, for converting the analog signals to digital signals;

a bandpass filter for filtering the digital signals to generate filtered signals containing frequencies of a specific bandwidth;

an approximate-direction finder, connected to receive the filtered signals, for processing the filtered signals to find the approximate direction of the sound source in terms of a sensor pair selected among the microphones;

a precise-direction finder, connected to receive information from the approximate-direction finder, for finding the precise direction of the sound source by further processing the signals representing the sound waves based on the approximate direction; and a measurement qualification unit, connected to the precise-direction finder, for evaluating validity of the precise direction using a measurement criterion and invalidating the precise direction if the measurement criterion is not met.

12. The system of claim 11, wherein the microphones are omni microphones.

13. The system of claim 11, wherein the microphones are cardioid microphones.

14. The system of claim 11, wherein the microphones are dipole microphones.

15. The system of claim 11, wherein the specific bandwidth is determined by the frequency range of sound waves of interest to direction determination.

16. The system of claim 11, wherein the specific bandwidth is determined by a calibration process of dynamically adjusting the bandwidth to arrive at the optimal bandwidth.

17. The system of claim 11, wherein the measurement qualification unit comprises:

at least means for calculating a signal-to-noise ratio (SNR); and means for invalidating the precise direction if the SNR is below a threshold.

18. The system of claim 17, wherein the means for calculating a signal-to-noise ratio comprises:

means for calculating a signal power for a current signal block of the measured signals;

means for calculating a noise power by finding the minimum signal power over signal blocks within a predetermined time period; and means for calculating the signal-to-noise ratio by calculating the ratio of the signal power of a signal block to the noise power.

19. The system of claim 17, wherein the precise direction is calculated in terms of an azimuth angle and an elevation angle.

20. The system of claim 19, wherein the measurement qualification unit further comprises:

means for invalidating the precise direction of the wave source if the elevation angle is not within allowable values.

21. The system of claim 20, wherein the allowable values are between 30 to 150 degrees.

22. The system of claim 19, wherein the approximate-direction finder comprises:

means for calculating a zero-delay cross-correlation for pairs of sensors adjacent to each other; and means for identifying a sector direction by selecting the sensor pair having the highest zero-delay cross-correlation.

23. The system of claim 22, wherein the measurement qualification unit comprises:

means for comparing the estimated azimuth angle with the sector direction; and means for invalidating the precise direction of the wave source if the difference between the azimuth angle and the sector direction is not within allowable values.

24. The system of claim 23, wherein the allowable values are between −60 and 60 degrees.

25. The system of claim 17, wherein the precise-direction finder comprises:

means for identifying all sensor pairs within the sector;

means for calculating individual measured delays by calculating a full cross-correlation for every pair of sensors within the sector; and means for finding the precise direction by finding a least-square solution of the individual measured delays.

26. The system of claim 25, wherein the measurement qualification unit comprises:

means for generating individual estimated delays from the precise direction;

means for calculating a delay spread by calculating differences between the individual measured delays and the individual estimated delays; and means for invalidating the precise direction of the wave source if the delay spread exceeds a threshold.

27. A computer for processing digital signals representing a sound source, sampled from an array of microphones sensing sound waves from the sound source and for finding the direction of the sound source in a computer having a memory, comprising:

a program for finding the approximate direction of the sound source by processing the digital signals to find the approximate direction of the sound source in terms of a sensor pair selected among the microphones; the approximate direction finding program comprising:

a program for calculating a zero-delay cross-correlation for pairs of sensors adjacent to each other; and a program for identifying a sector direction by selecting the sensor pair having the highest zero-delay cross-correlation;

a program for finding the precise direction of the sound source by further processing the digital signals based on the approximate direction; and a program for measurement qualification by evaluating validity of the precise direction using a measurement criterion and invalidating the precise direction if the measurement criterion is not met.

28. The computer of claim 27, wherein the program for finding the precise-direction of the sound source comprises:

a program for identifying all sensor pairs within the sector;

a program for calculating individual measured delays by calculating a full cross-correlation for every pair of sensors within the sector; and a program for finding the precise direction by finding a least-square solution of the individual measured delays.

29. The computer of claim 27, wherein the program for measurement qualification comprises:

at least a program for calculating a signal-to-noise ratio (SNR); and a program for invalidating the precise direction if the SNR is below a threshold.

30. A system for controlling the direction of a microphone to the direction of a particular sound source, comprising:

an array of microphones arranged in a predetermined geometry, each microphone for sensing sound waves from the sound source and generating analog signals representing the sound waves; said array of microphones being a directional microphone array having an adaptive filter for suppressing interference, wherein the adaptive filter has a weight-constraining unit where frequency representations of filter weights are constrained to a threshold to suppress directional interferences;

an approximate-direction finder, receiving the signals representing the sound, for calculating the approximate direction of the sound source in terms of a pair of microphones selected among the microphones;

a precise-direction finder, connected to the approximate-direction finder, for finding the precise direction of the sound source based on the approximate direction found;

a measurement qualification unit for generating a quality figure of measurement by evaluating validity of the precise direction using a measurement criterion; and a controller for controlling the movement of the microphone using the precise direction of the sound source and the quality figure.

31. A system for controlling the direction of a microphone to the direction of a particular sound source, comprising:

an array of directional microphones arranged in a predetermined geometry, each directional microphone for sensing sound waves from the sound source and generating analog signals representing the sound waves; wherein the directional microphone array further comprises a dual-processing interference cancelling system comprising:

an adaptive-processing filter for processing a first portion of a frequency band; and a fixed-processing filter for processing a second portion of the frequency band;

an approximate-direction finder, receiving the signals representing the sound, for calculating the approximate direction of the sound source in terms of a pair of microphones selected among the microphones;

a precise-direction finder, connected to the approximate-direction finder, for finding the precise direction of the sound source based on the approximate direction found;

a measurement qualification unit for generating a quality figure of measurement by evaluating validity of the precise direction using a measurement criterion; and a controller for controlling the movement of the microphone using the precise direction of the sound source and the quality figure.

32. The system of claim 31, wherein the adaptive filter has a weight-constraining unit where frequency representations of filter weights are constrained to a threshold to suppress directional interferences.

33. A method of finding the direction of a sound source, comprising the steps of:
generating analog signals representing waves from the sound source using an array of sensors arranged in a predetermined geometry, each sensor for sensing waves;
converting the analog signals to digital signals;
filtering the digital signals to generate filtered signals containing frequencies of a specific bandwidth;
processing the signals to find the approximate direction of the wave source in terms of a sensor pair selected among the sensors;
finding the precise direction of the wave source by further processing the signals representing the waves based on the approximate direction; and
qualifying measurements by evaluating the validity of the precise direction of the wave source using a measurement criterion and invalidating the precise direction if the measurement criterion is not met; wherein the step of qualifying measurements comprises:
calculating a signal power for a current signal block of the measured signals;
calculating a noise power by finding the signal block having the minimum signal power over signal blocks within a predetermined time period; and
calculating the signal-to-noise ration (SNR) by calculating the ration of the signal power to the noise power; and
invalidating the precise direction if the SNR is below a threshold.

34. The method of claim 33, wherein the precise direction is calculated in terms of an azimuth angle and an elevation angle.

35. The method of claim 34, wherein the step of qualifying measurement further comprises:
invalidating the precise direction of the wave source if the elevation angle is not within allowable values.

36. The method of claim 35, wherein the allowable values are between 30 to 150 degrees.

37. The method of claim 34, wherein the step of finding the approximate direction comprises:
calculating a zero-delay cross-correlation for pairs of sensors adjacent to each other; and
identifying the sector direction by selecting the sensor pair having the highest zero-delay cross-correlation.

38. The method of claim 37, wherein the step of qualifying measurement comprises:
comparing the estimated azimuth angle with the sector direction; and
invalidating the precise direction if the difference between the azimuth angle and the sector direction is not within allowable values.

39. The method of claim 38, wherein the allowable values are between −60 and 60 degrees.

40. The method of claim 33, wherein the step of finding the precise direction comprises:
identifying all sensor pairs within the sector;
calculating individual measured delays by calculating a full cross-correlation for every pair of sensors within the sector; and
finding the precise direction of the sound source by finding a least-square solution of the individual measured delays.

41. The method of claim 40, wherein the step of qualifying measurement comprises:
generating individual estimated delays from the precise direction;
calculating a delay spread by finding differences between the individual measured delays and the individual estimated delays; and
invalidating the precise direction if the delay spread exceeds a threshold.

42. The method of claim 33, wherein the microphones are omni microphones.

43. The method of claim 33, wherein the microphones are cardioid microphones.

44. The method of claim 33, wherein the microphones are dipole microphones.

45. The method of claim 33, wherein the specific bandwidth is determined by the frequency range of sound waves of interest to direction determination.

46. The method of claim 33, wherein the specific bandwidth is determined by a calibration process of dynamically adjusting the bandwidth to arrive at the optimal bandwidth.

47. A method for processing digital signals representing a sound source, sampled from an array of microphones sensing sound waves from the sound source and for finding the direction of the sound source in a computer having a memory, comprising the steps of:
finding the approximate direction of the sound source by calculating a zero-delay cross-correlation for pairs of sensors adjacent to each other; and identifying a sector direction by selecting the sensor pair having the highest zero-delay cross-correlation
finding the precise direction of the wave source by further processing the signals representing the waves based on the approximate direction; and
qualifying measurements by evaluating the validity of the precise direction of the wave source using a measurement criterion and invalidating the precise direction if the measurement criterion is not met.

48. The method of claim 47, wherein the step of finding the precise-direction of the sound source comprises the steps of:
identifying all sensor pairs within the sector;
calculating individual measured delays by calculating a full cross-correlation for every pair of sensors within the sector; and
finding the precise direction by finding a least-square solution of the individual measured delays.

49. A method of finding the direction of a directional microphone system to the direction of a particular sound source, comprising the steps of:
generating signals representing sound waves from the sound source using the directional microphone system that comprises an array of microphones arranged in a predetermined geometry and an adaptive filter for suppressing interference, each microphone for sensing the sound waves;
processing the signals to find the approximate direction of the wave source in terms of a sensor pair selected among the microphones;
finding the precise direction of the wave source by further processing the signals representing the waves based on the approximate direction found; and
generating a quality figure of measurement by evaluating validity of the precise direction using a measurement criterion; and
controlling the movement of the microphone system using the precise direction of the sound source and the quality figure.

* * * * *